United States Patent
Fanfant et al.

(10) Patent No.: US 7,693,831 B2
(45) Date of Patent: Apr. 6, 2010

(54) DATA PROCESSING THROUGH USE OF A CONTEXT

(75) Inventors: Robert E. Fanfant, Mercer Island, WA (US); Ryan S. Kaminsky, Kirkland, WA (US); Scott S. Grosenick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 124 days.

(21) Appl. No.: 11/277,330

(22) Filed: Mar. 23, 2006

(65) Prior Publication Data

US 2007/0226181 A1 Sep. 27, 2007

(51) Int. Cl.
*G06F 17/30* (2006.01)
(52) U.S. Cl. .............................. 707/3; 709/215; 725/37
(58) Field of Classification Search ........................ None
See application file for complete search history.

(56) References Cited

U.S. PATENT DOCUMENTS

| 5,864,860 A | * | 1/1999 | Holmes ....................... 707/101 |
| 6,556,988 B2 | * | 4/2003 | Tsuchida et al. ................ 707/3 |
| 6,631,466 B1 | * | 10/2003 | Chopra et al. ................ 712/300 |
| 7,111,011 B2 | * | 9/2006 | Kobayashi et al. ........... 707/102 |
| 2002/0035561 A1 | * | 3/2002 | Archer et al. ................... 707/6 |
| 2006/0064716 A1 | * | 3/2006 | Sull et al. ....................... 725/37 |
| 2006/0117006 A1 | * | 6/2006 | Howard et al. .................. 707/6 |
| 2006/0167873 A1 | * | 7/2006 | Degenaro et al. .............. 707/6 |
| 2007/0055664 A1 | * | 3/2007 | Michaeli et al. ................ 707/6 |
| 2007/0130140 A1 | * | 6/2007 | Cytron et al. ................... 707/6 |

* cited by examiner

*Primary Examiner*—Pierre M Vital
*Assistant Examiner*—Loan T Nguyen
(74) *Attorney, Agent, or Firm*—Lee & Hayes, PLLC

(57) ABSTRACT

Data context techniques are described. In an implementation, a method includes determining, by each of a plurality of nodes, whether an item of data contained in a respective node matches one or more items referenced by a context that is broadcast to the plurality of nodes. When the determining results in a match, an indication is emitted by the respective node that identifies a particular one of the items reference by the context.

8 Claims, 6 Drawing Sheets

DATA PROCESSING THROUGH USE OF A CONTEXT

BACKGROUND

Vast amounts of data are communicated over networks at any one time. For example, billions of web pages are communicated over the Internet in a given day, television programs are communicated to millions of users over the air, via cable and satellite connections, and so on. Because of the vast amounts of data that may be involved, traditional techniques which are employed to process this data may be insufficient.

For example, traditional techniques used to analyze a traditional amount of data may be insufficient when confronted with a vast amount of data. A service, for instance, may be provided which analyzes data that describes consumption by users of different content over the Internet. Because even a single user may navigate to hundreds of web pages and so on during a single browsing session, for example, a vast amount of data may be obtained when collected from a plurality of users. Traditional techniques that were used to analyze this data, however, may be hardware and software intensive such that these traditional techniques are not able to "keep up" with the pace that the data may be obtained.

In another example, communication of data over a network may be limited to a particular amount of bandwidth. This bandwidth, however, may not be sufficient to provide for the ever increasing amounts of data that are desired by users, which may lead to a reduction in functionality availability to users of the network and consequently user frustration.

SUMMARY

Techniques are described which may utilize contexts of data to provide for a variety of processing functionality, such as analysis and/or compression of data. In an implementation, a method includes determining, by each of a plurality of nodes, whether an item of data contained in a respective node matches one or more items referenced by a context that is broadcast to the plurality of nodes. When the determining results in a match, an indication is emitted by the respective node that identifies a particular one of the items referenced by the context. Data distributed among the plurality of nodes may be obtained from a variety of different sources, such as service providers that analyze user consumption of content, data communicated by content providers over a network, and so on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Traditional techniques which were utilized to process data may be insufficient when confronted with a vast amount of data. For example, a service may be provided that analyzes data that describes consumption of content by multiple users, such as web pages obtained via the Internet and so on. However, because each of these users may navigate to hundreds of web pages during even a single browsing session, a vast amount of data may be collected from these multiple users.

Techniques are described in which nodes and contexts are utilized to process data. For example, data may be obtained and distributed among a plurality of nodes. A pattern is defined (e.g., by an interested entity, such as a content provider) of a particular browsing scenario, such as from a particular logon web page to another web page having content of the content provider. A context may then be described for the pattern which references items contained in the pattern, such as the particular logon web page and the other web page.

The context may then be broadcast to the plurality of nodes. The context is used by the nodes to determine whether the node includes one or more of the items. When the node does contain one of the items (e.g., a description of one of the web pages), the node emits an indication. The indication, for instance, may specify that the node contains a particular one of the items. Thus, instead of determining whether the pattern is included by one or more of the nodes by comparing the pattern to each of the nodes in succession, the nodes themselves may make the determination and emit an indication of whether a "positive" or "negative" result is obtained, i.e., the node contains or does not contain the item. A notification that the node is included in the pattern may then be sent back to the nodes having items in the pattern such that a subsequent broadcast of the context does not cause the node to reemit another indication, and thus precludes "double counting" of the item. However, when a different context is broadcast that references the item included in the node, the node may emit another indication that the item is included in that other context. A variety of other examples are also contemplated, further discussion of which may be found in relation to the following figures. Although use of a context to process navigation data is described, it should be apparent that a wide variety of uses are contemplated, such as for speech recognition where nodes could be syllables and patterns could be words, and so on.

In the following discussion, an exemplary environment is first described that is operable to perform the data context techniques. Exemplary procedures are then described which may be employed in the exemplary environment, as well as in other environments.

Exemplary Environment

Figure 1:
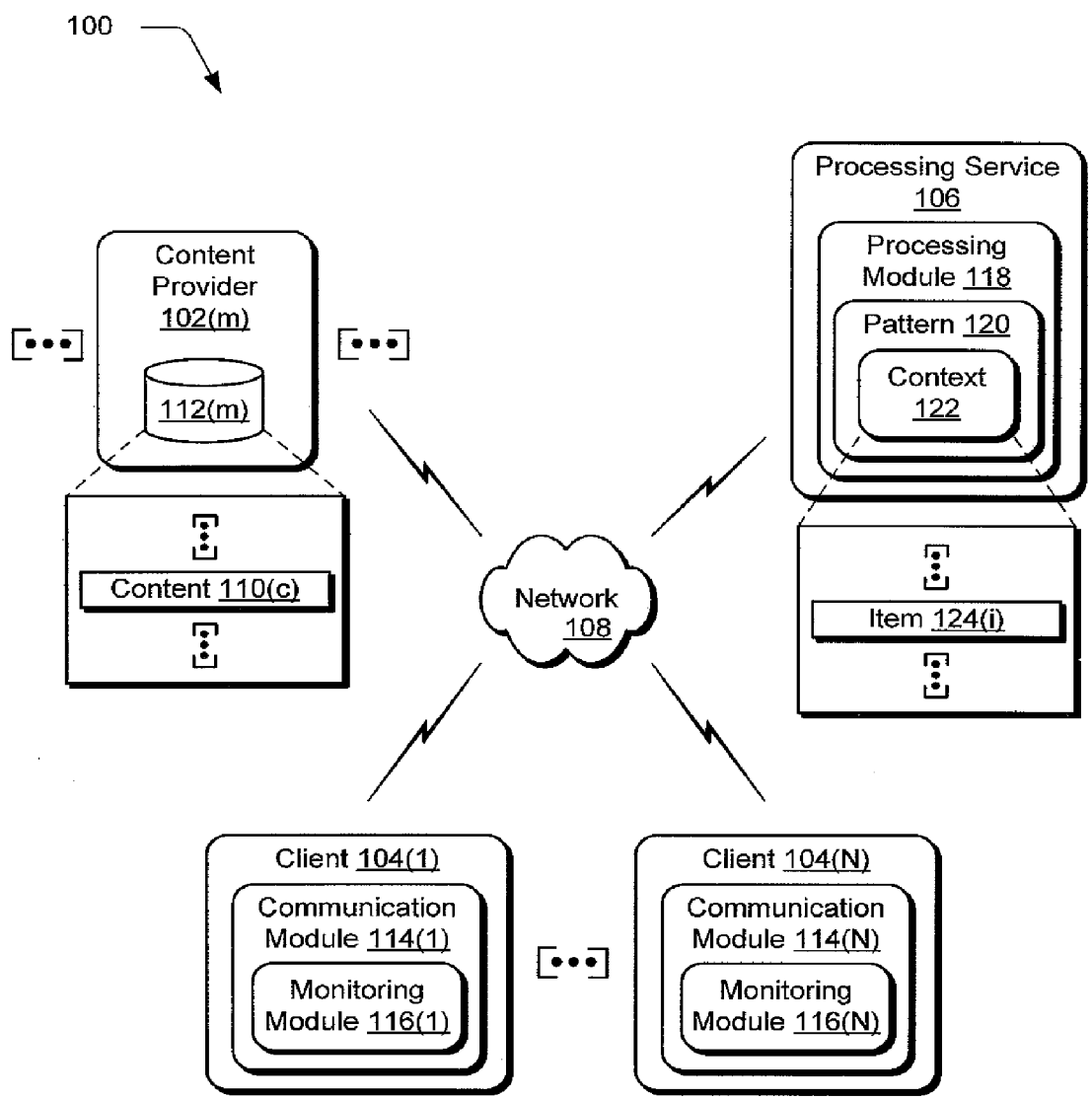
FIG. 1 is an illustration of an environment in an exemplary implementation that is operable to process data through use of a context.

FIG. 1 illustrates an environment 100 in an exemplary implementation that is operable to employ techniques to process data using one or more contexts. The illustrated environment 100 includes a plurality of content providers 102(m) (where "m" can be any integer from one to "M"), a plurality of client devices 104(1), ..., 104(N) and a processing service 106 that are communicatively coupled, one to another, via a network 108. The clients 104(1)-(N) may be configured in a variety of ways for accessing the content providers 102(m). For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. For instance, the content provider 102(m) and the processing service 106 may be communicatively coupled via a corporate Intranet to communicate, one to another. Additionally, both the content provider 102(m) and the processing service 106 may be communicatively coupled to the clients 104(1)-104(N) over the Internet. A wide variety of other instances are also contemplated The content provider 102(m) is illustrated as including a plurality of content 110(m) (where "c" can be any integer from one to "C") in storage 112(m). The content may be configured in a variety of ways, such as web pages, downloadable songs, television programs, outputs from interactive services (e.g., online banking), and so on. To interact with this content 110(m) over the network 108, the clients 104(1)-104(N) are illustrated as including respective communication modules 114(1)-114(N). The communication modules 114(1)-114(N) are representative of functionality that may be employed by the respective clients 104(1)-104(N) to gain network access, such as through use of a browser or other application module configured for network 108 access.

As previously described, the clients 104(1)-104(N) may interact with a vast amount of content 110(m) from the content providers 102(m) via the network 108. In some instances, however, it may be desirable to monitor this interaction to determine the content, with which, the clients interact and how this interaction is performed. Therefore, the communication module 114(1)-114(N) may each incorporate respective monitoring modules 116(1)-116(N) that are executable to monitor this interaction automatically and without user interaction. Data describing the monitored interaction may then be communicated via the network 108 to the processing service 106 for analysis.

The processing service 106, for instance, is illustrated as including a processing module 118 that is executable to process the data obtained from the clients 104(1)-104(N). In order to process what may be a vast amount of data obtained from the clients 104(1)-104(N), the processing module 118 may incorporate a pattern 120 having a context 122 that references one or more items 124(i), where "i" can be any integer from one to "I". For example, the pattern 120 may describe a sequence of content interaction that may be performed by the clients 104(1)-104(N), such as from a logon page to a content selection page, to track successful logon attempts made by the clients 104(1)-104(N). The context 122 references the items 124(m) included in the pattern, e.g., the logon page and the content selection page in this example. In other words, the items 124(m) referenced by the context 122 are the "ingredients" that are included in the "recipe" of the pattern 120. The pattern 120, as the "recipe", may define "conditions" involving the items 124(m), such as an order of the items 124(m), criteria for inclusion/exclusion of the items 124(m), and so on. For example, the pattern 120 may be defined as a regular expression that defines several sequences of the items 124(m) that, if satisfied, result in a "match" between the pattern 120 and data obtained from the clients 104(1)-104(N). Continued discussion of the use of patterns 120 and context 122 to process data may be found in relation to FIG. 2.

Although processing of data describing content interaction has been described in this example, patterns 120 and contexts 122 may be utilized to provide a wide variety of other functionality. For example, content 110(m) from the content provider 102(m) may be processed by the processing service 106 to compress the content 110(m) for communication over the network 108 to the clients 104(1)-104(N). In this example, the content provider 102(m) incorporates the functionality of the processing service 106 to find matching patterns and provide representations of those patterns in the content, thereby compressing the content for communication over the network 108. The clients 104(1)-104(N) may then decompress the content by replacing the identifications of the patterns with items referenced in the pattern. Thus, it should be apparent that the environment 100 may be arranged in a variety of ways, such as through incorporation of all or part of the processing service 106 by the content provider 102(m) and/or the clients 104(1)-104(N). A variety of other examples are also contemplated without departing from the spirit and scope thereof.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the processing techniques described below are platform-independent, meaning that the techniques may be implemented on a variety of commercial computing platforms having a variety of processors.

Figure 2:
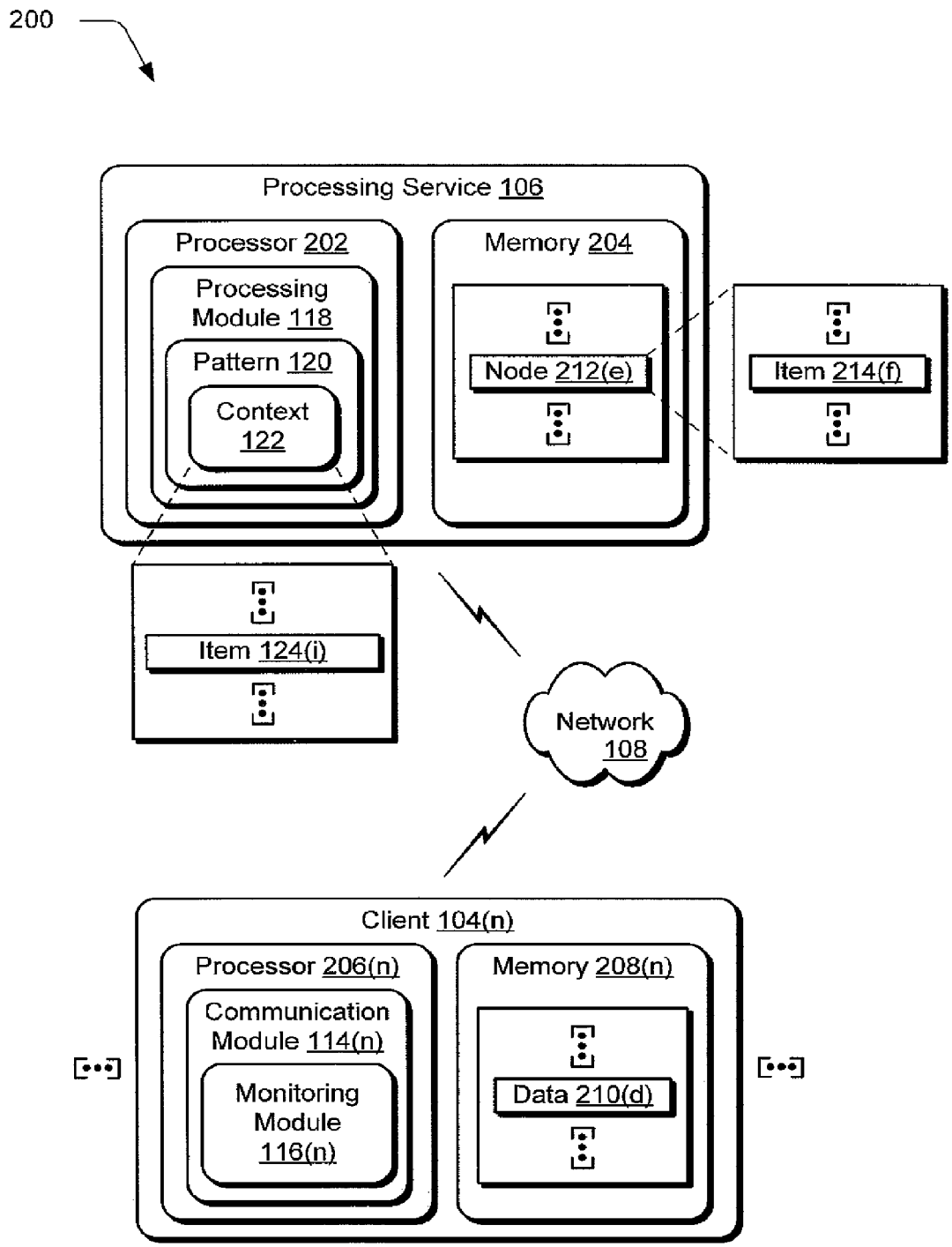
FIG. 2 is an illustration of a system in an exemplary implementation showing a processing service and a client of FIG. 1 in greater detail.

FIG. 2 is an illustration of a system 200 in an exemplary implementation showing the processing service 106 and a client 104(n) of FIG. 1 in greater detail. The processing service 106 is illustrated as being implemented as a device having a processor 202 and memory 204. Client 104(n) may be representation of any one of the plurality of clients 104(1)-104(N) of FIG. 1 and, in this instance, is illustrated as a client device having a processor 206(n) and memory 208(n).

Processors are not limited by the materials from which they are formed or the processing mechanisms employed therein.

For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204, 208(n) is shown, respectively, for the processing service 106 and the client 104(n), a wide variety of types and combinations of memory may be employed, such as random access memory (RAM), hard disk memory, removable medium memory, and other types of computer-readable media.

The client 104(n) is illustrated as executing the communication module 114(n), having the monitoring module 116(n), on the processor 206(n), which is also storable in memory 208(n). The communication module 114(n), through execution of the monitoring module 116(n), generates data 210(d) (where "d" can be any integer from one to "D") that describes consumption of content 110(m) by the client 104(n). This data 210(d) may then be uploaded to the processing service 106 for analysis over network 108.

For example, the processing service 106, through execution of the processing module 118, configures a plurality of nodes 212(e) (where "e" can be any integer from one to "E") to store the data 210(d) as items 214(f) (where "f" can be any integer from one to "F") in the nodes 212(e). For instance, the processing service 106 may receive an interlaced stream of data that includes data 210(d) from a plurality of clients 104(n). The interlaced stream may be demultiplexed such that each original stream that corresponds to a respective client 104(n) is placed within a respective plurality of nodes 212(e). A variety of other instances are also contemplated without departing from the spirit and scope thereof.

The processing module 118 may then determine whether the pattern 120 is present in items 214(f) of the nodes 212(e). For example, the context 122, which references one or more items 124(m) may be broadcast to the nodes 212(e). Based on the broadcast, the nodes 212(e) may determine whether the items 214(f) included in the nodes 212(e) are included in the context 122. If so, the nodes 212(e) may indicate which of the items referenced by the context 122 are included in the nodes 212(e). The processing module 118 may then determine, based on the indications, whether the pattern 120 is present, i.e., a "positive" result. Thus, using this technique, the "recipe" of the pattern 120 is broadcast and notifications received in reply as to which of those "ingredients" (i.e., the items 124(m)) are included in the nodes 212(e). In this way, the processing module 118 may determine the presence of the items 124(m) without individually examining the items 214(f) in the nodes 212(e) in succession. Further discussion of processing of data 210(d) through use of a context may be found in relation to FIGS. 3-6.

Exemplary Procedures

The following discussion describes processing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
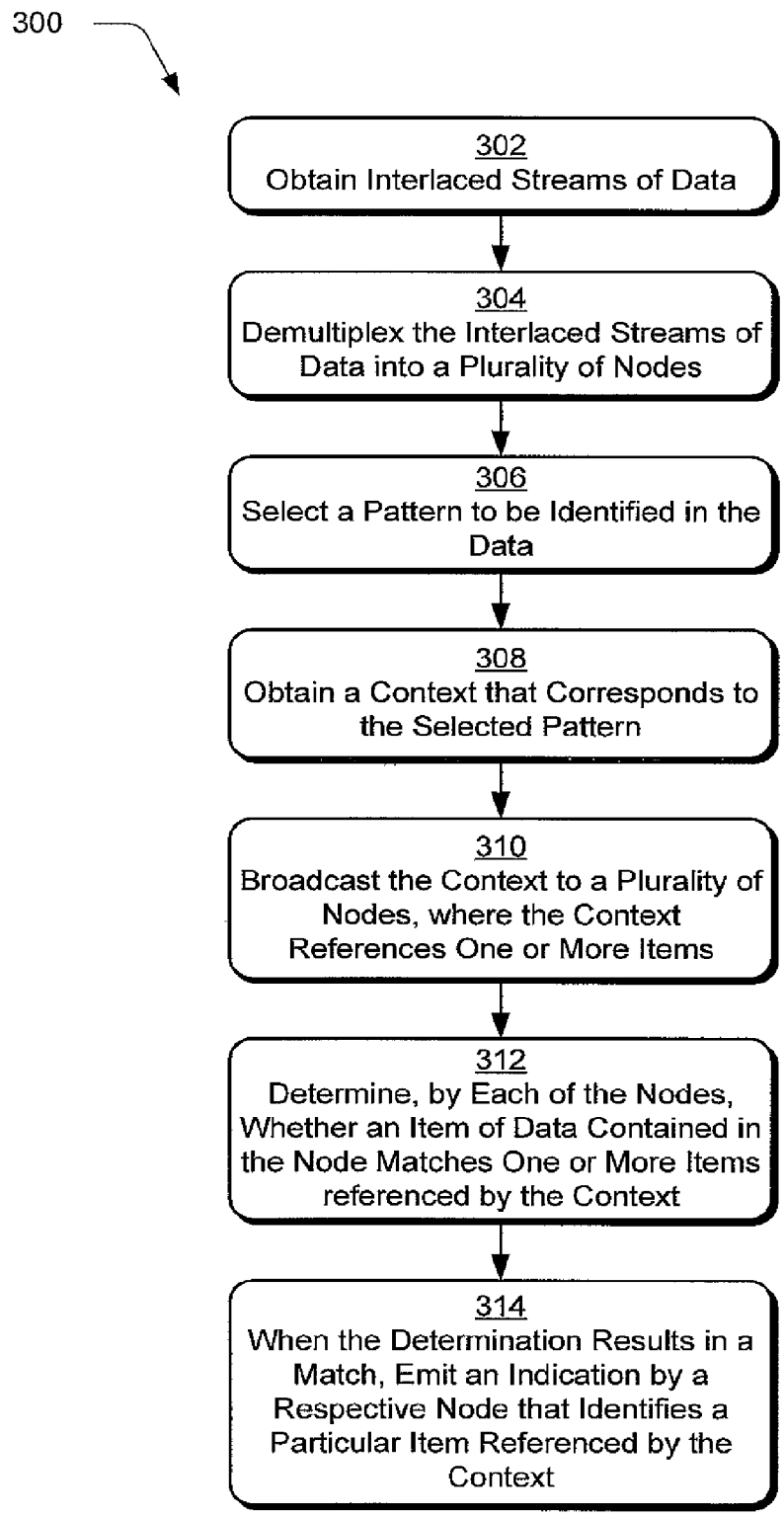
FIG. 3 is a flow diagram depicting a procedure in an exemplary implementation in which existence of items referenced by a context in nodes having data obtained from interlaced streams is determined.
Figure 4:
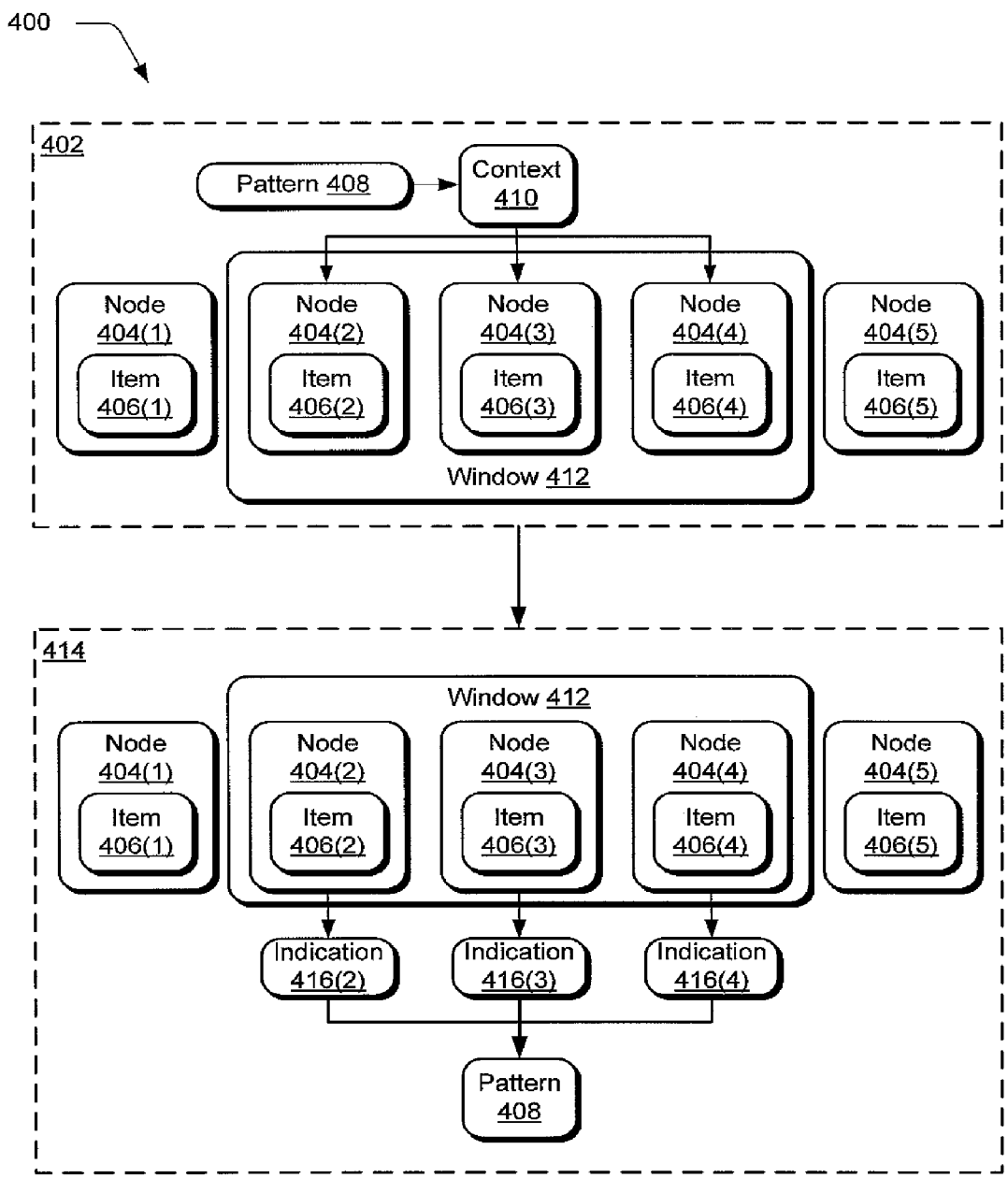
FIG. 4 is an illustration of an exemplary implementation of a broadcast of a context and emission of indications accordingly to the procedure of FIG. 3.

FIG. 3 depicts a procedure 300 in an exemplary implementation in which the existence of items referenced by a context in nodes having data obtained from interlaced streams is determined. During the discussion of FIG. 3, reference will also be made to an exemplary implementation 400 illustrated in FIG. 4 of context broadcast and emission of indications.

Interlaced streams of data are obtained (block 302) and demultiplexed into a plurality of nodes (block 304). For example, in block 402 of FIG. 4, a plurality of nodes 404(1)-404(5) are illustrated, each of which having a respective item 406(1)-406(5) of data. The items 406(1)-406(5) are "atomic" units of data that may appear in multiple contexts and the use of which may vary by context, much like the use of an ingredient by different recipes. For instance, each item 406(1)-406(5) may correspond to data obtained from a particular client device, correspond to data obtained at different points in time, different portions of multimedia content (e.g., portions of a web page, television program, and so on for compression) and so on.

A pattern is selected to be identified in the data (block 306) and a context is obtained that corresponds to the selected pattern (block 308). For example, a content provider 102(m) may wish to determine how many attempts by clients 104(1)-104(N), when accessing content 110(m), are unsuccessful after logon due to network error. Therefore, the content provider 102(m) may create a pattern 408 that describes a logon page (i.e., a first item) that is to be followed by (i.e., a condition) a content selection page (i.e., a second item), which is followed by a display of a dialog box of a "network error" (i.e., a third item). Therefore, the context 410, obtained from the pattern 408, references the first item (e.g., the logon page), the second item (e.g., the content selection page), and the third item (e.g., the dialog box).

The context is broadcast to the plurality of nodes, where the context references one or more items (block 310). Continuing with the previous example, the context 410 of FIG. 4 references the logon page, the content selection page, and the dialog box and is broadcast to each of the nodes 406(1)-406(5). In an implementation, a window 412 is employed such that the broadcast is performed to nodes that satisfy defined criteria. This defined criteria may include data that corresponds to a particular period of time (e.g., the data remains stored for a period of time, which may be real time or recorded time), a threshold amount of data being accumulated by the nodes, "aging" data that has been stored for a threshold amount of time, and so on. In another implementation, the broadcast may be performed to each of the nodes 404(1)-404(5) with the determination of whether the data within the node is "eligible" being performed by the node. A variety of other implementations are also contemplated.

A determination is made, by each of the nodes having eligible data, whether an item of data contained in the node matches one or more items referenced by the context (block 312). For example, each of the nodes 404(2)-404(4) may compare respective items 406(2)-406(4) with items referenced in the broadcast context 410 as shown in block 414 of FIG. 4. Although each node 404(2)-404(4) is illustrated as having a single respective item 406(2)-406(4), it should be apparent that in another implementation one or more of the nodes 404(2)-404(4) may have one or more items.

When the determination results in a match, an indication is emitted by a respective node that identifies a particular item referenced by the context (block 314). For example, nodes 404(2)-404(4) of block 414 may determine that the respective items 406(2)-406(4) match items referenced in the broadcast performed at block 402. Node 404(2), for instance, may determine that item 406(2) matches the logon page, node 404(4) may determine that item 406(4) matches the context selection page and node 404(3) may determine that item 406(3) matches the dialog box. Therefore, each of the nodes 404(2)-404(4) may emit respective indications 416(2)-416(4) that identify particular items 406(2)-406(4) included by the respective nodes, e.g., the logon page, the dialog box and the content selection page.

It should be noted that in this example the emitted indications 416(2)-416(4) are "out of order" and yet, may be used to account for non-sequential receipt of data (i.e., jitter) for situations when data is not guaranteed to be received in sequence. For example, the window 412 may provide for correction of jitter by allowing data to "linger" in the window 412. In an implementation, the emitted indications 416(2)-416(4) may then be utilized to determine whether the pattern 408 is present in the nodes 404(2)-404(4) regardless of order, further discussion of which may be found in relation to the following figures.

Figure 5:
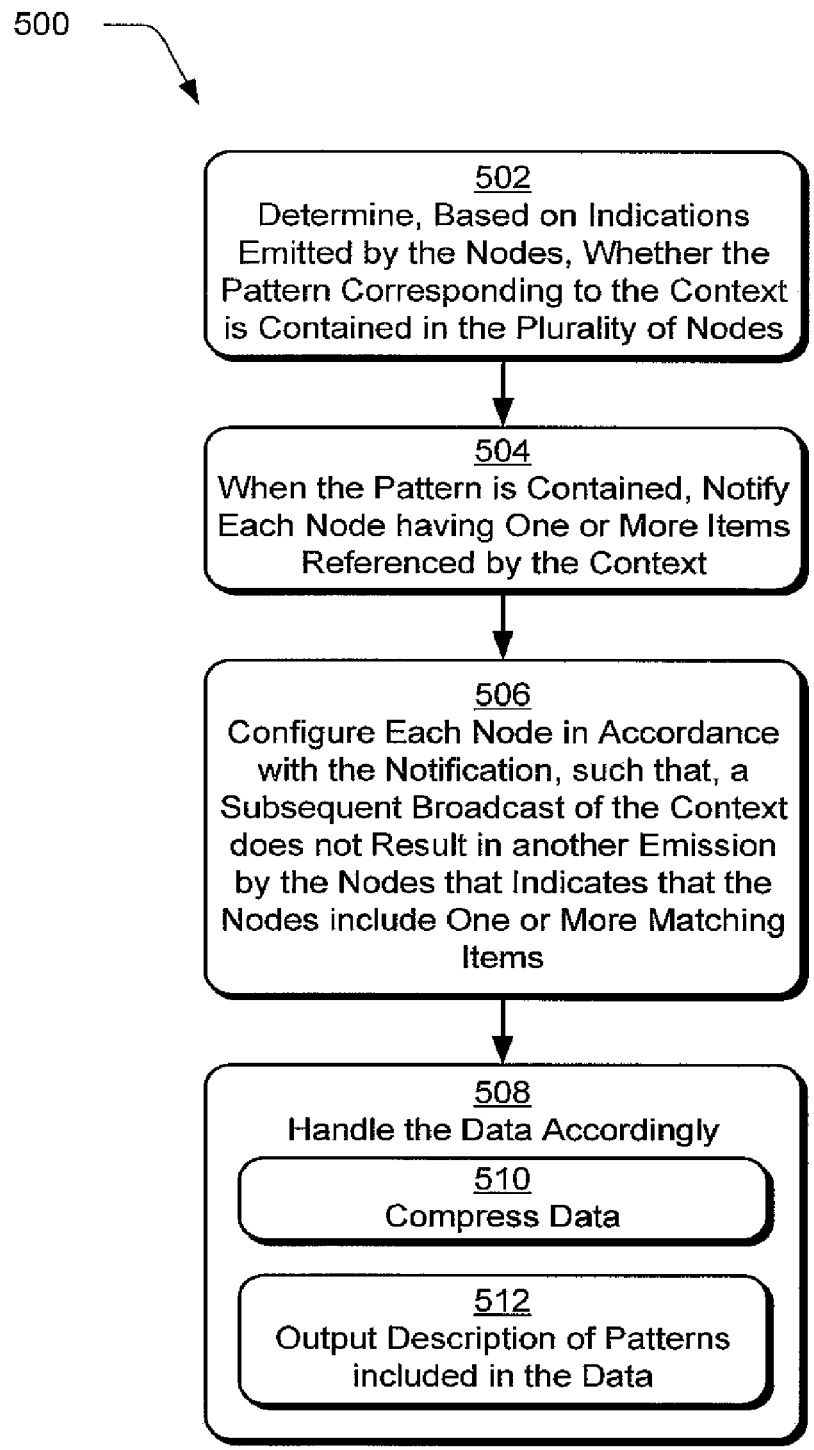
FIG. 5 is a flow diagram depicting a procedure in an exemplary implementation in which a determination is performed of whether a pattern is included in items of data contained in nodes based on emission of indications by the nodes accordingly to the procedure of FIG. 3.

FIG. 5 depicts a procedure 500 in an exemplary implementation in which a determination is performed of whether a pattern is included in items of data contained in nodes based on emission of indications by the nodes according to the procedure 300 of FIG. 3. During the discussion of FIG. 5, reference will also be made to FIG. 6, which illustrates an exemplary implementation 600 of a determination of a pattern and subsequent communication of notifications to the nodes regarding existence of the pattern accordingly to the procedure of FIG. 5.

A determination is made, based on the indications emitted by the nodes, whether the pattern corresponding to the context is contained in the plurality of nodes (block 502). For example, the processing module 118 may examine the indications 416(2)-416(4) (e.g., the respective indications of the logon page, the dialog box and the content selection page) to determine whether the pattern 408 (e.g., the logon page, the content selection page and the dialog box) is included in the nodes 404(2)-404(4). In this instance, the pattern 408 may indicate that correct ordering of the items is not necessary to account for jitter, and therefore presence of the three referenced items is sufficient to provide a "match".

When the pattern is contained, each node having one or more items referenced by the context is notified (block 504). The processing module 118, for example, may notify the nodes 404(2)-404(4) that the items were contained in the pattern 408. Each node is then configured in accordance with the notification, such that a subsequent broadcast of the same context does not result in another emission by the nodes that indicate that the nodes include one or more matching items (block 506). For example, the notification may be stored by the nodes 404(2)-404(4) such that a subsequent broadcast of the pattern 408 does not result in another emission of indications by the nodes 402(2)-402(4), thereby preventing "double counting" of the pattern 408.

Figure 6:
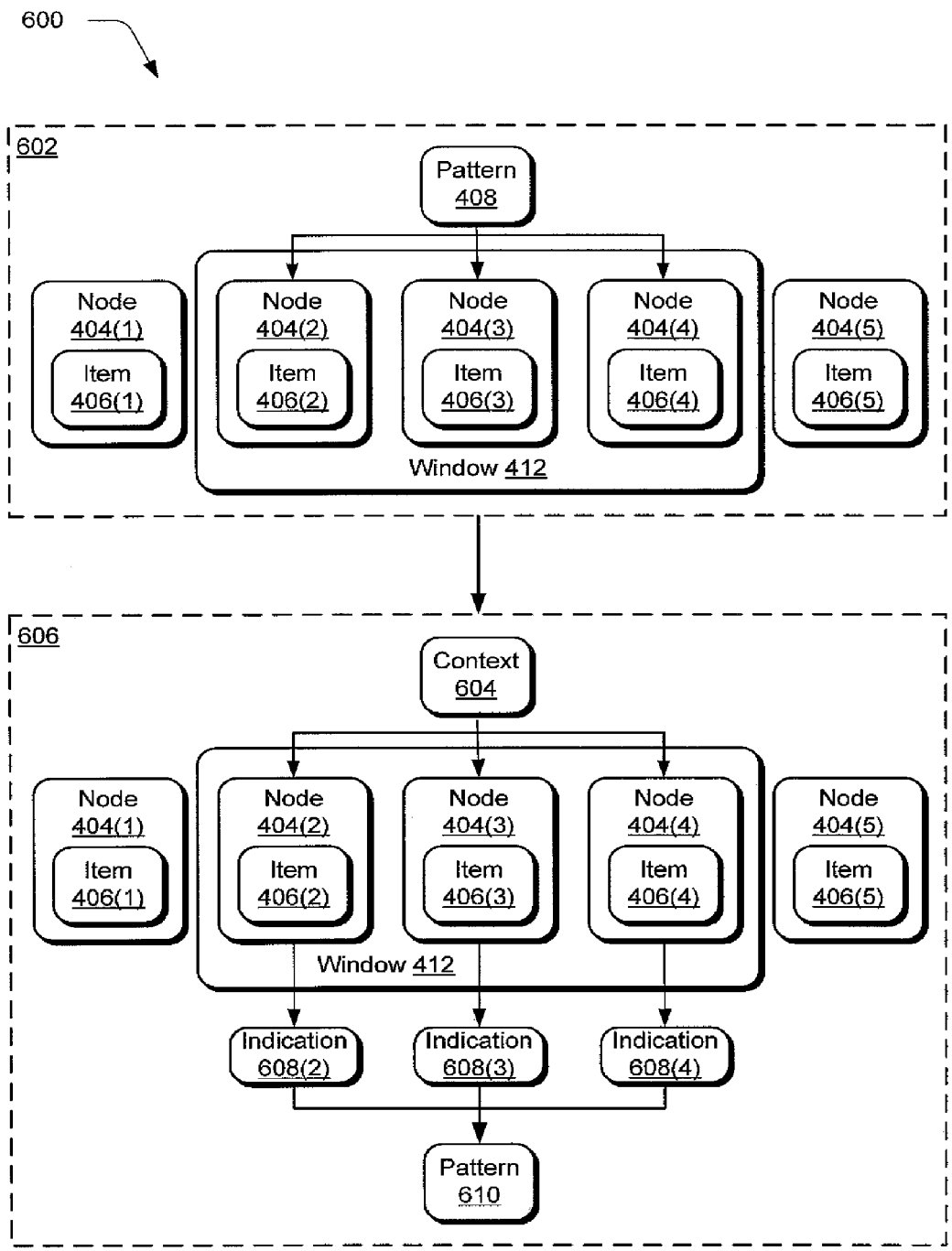
FIG. 6 is an illustration of an exemplary implementation of a determination of a pattern and subsequent communication of notifications to the nodes regarding existence of the pattern accordingly to the procedure of FIG. 5.

However, a broadcast by another context 604, as shown in block 606 of FIG. 6 may result in another emission of indications 608(2)-608(4), which in this case indicate the particular items as well as the particular context. The indications 608(2)-608(4) may also be used in conjunction with the other pattern 610 to determine whether the pattern 610 is included in the nodes 404(2)-404(4). Thus, the procedure 500 may revert back to block 306 of procedure 300 and repeat for multiple patterns. In additional, patterns may be compounded, such that existence of multiple patterns indicates existence of the compound pattern, e.g., pattern one plus pattern two equals pattern three. A variety of other instances are also contemplated.

Once the patterns are through processing the data, the data may be handled accordingly (block 508). For example, identification of the patterns may be used to compress the data (block 510), such as to compress television or other content before communication over the network 108. In another example, descriptions of patterns included in the data may be output (block 512), such as to output how many attempts to interact with particular content were unsuccessful due to network error, e.g., through existence of the logon page, the content selection page and the dialog box. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   demultiplexing interlaced streams of data into a plurality of nodes, wherein each stream that corresponds to a respective client is placed within a respective plurality of nodes;
   determining, by each of the plurality of nodes, whether an item of data contained in a respective said node matches one or more hems referenced by a context that is broadcast to the plurality of nodes, wherein a window is employed that defines an amount of time corresponding to individual broadcasts of the context, that the items contained in the nodes are eligible for the determining;
   when the determining, by each of the plurality of nodes, results in a match, emitting an indication by the respective said node which identifies a particular said item referenced by the context, wherein the presence of the hem of data is determined without examining the plurality of nodes in succession;
   determining whether a pattern corresponding to the context is contained in the plurality of nodes,
   when the pattern is contained, receiving a notification by each said node that one or more items contained in the node are included in the pattern;
   configuring each said node having one or more items that are included in the pattern to prevent a subsequent broadcast of the context from causing a subsequent emission indication that the node includes one or more of the referenced items contained in the context;
   configuring each said node having one or more items that are included in the pattern to prevent a different context broadcast to subsequently emit an indication that the node includes one or more of the referenced items contained in the different context;
   outputting descriptions of patterns included in the data from the streams comprising a number of unsuccessful attempts to interact with a particular content due to a network error; and
   compressing the data from the streams by replacing a matching pattern comprised of at least one item of data with an identification of the matching pattern.

2. A method as described in claim 1, wherein: the context references items included in a pattern; and the pattern defines one or more conditions relating to the referenced one or more items.

3. A method as described in claim 1, wherein the pattern defines a regular expression.

4. A method as described in claim 1, wherein the determining is performed when a threshold amount of the data is received.

5. A method comprising:
demultiplexing interlaced streams of data into a plurality of nodes, wherein each stream that corresponds to a respective client is placed within a respective plurality of nodes;
broadcasting a context to the plurality of nodes, wherein the context references one or more items of data;
determining, based on indications emitted by the nodes as a result of the broadcasting, whether a pattern corresponding to the context is contained in the plurality of nodes;
when the pattern is contained, notifying each said node having one or more of the items referenced by the context;
configuring each said node that is notified that one or more items of the data contained in the node are part of the identified pattern associated with the context wherein a subsequent broadcast of the context does not result in a subsequent emission indicating that the node includes the one or more items contained in the context;
outputting descriptions of patterns included in the data from the streams comprising a number unsuccessful attempts to interact with a particular content; and
compressing the data from the streams by replacing a matching pattern comprised of at least one item of data with an identification of the matching pattern,
wherein a window is employed that defines an amount of time that items of data contained in the nodes are eligible for the determining.

6. A method as described in claim 5, wherein the data emitted by the nodes is also a result of a comparison by each said node of items of data referenced in the broadcast with data included in the node.

7. One or more computer-readable storage media comprising executable instructions that, when executed, direct a computer to:
demultiplex an interlaced stream of data into a plurality of nodes, wherein each stream that corresponds to a respective client is placed with a respective plurality of nodes;
broadcast a plurality of contexts to the plurality of nodes, wherein each said context references one or more items of data;
determine, by each of a plurality of nodes, whether an item of data contained in a respective said node matches one or more of the referenced items in respective said contexts included in the broadcast;
determine whether a plurality of patterns, each corresponding to a respective said context, are contained in the plurality of nodes based on indications emitted by the plurality of nodes;
when a respective said pattern is contained, notifying each said node having one or more of the items referenced by a corresponding said context such that the node does not emit a subsequent notification in response to a subsequent broadcast of the corresponding said context;
output descriptions of patterns included in the data from the streams; and
compress the data from the streams by replacing a matching pattern comprised of at least one item of data with an identification of the matching pattern,
wherein data included in the interlaced stream of data is nonsequential.

8. One or more computer-readable storage media as described in claim 7, wherein the computer-executable instructions further direct the computer to employ a window that defines an amount of time that items contained in the nodes are eligible for the determination.

* * * * *